US012487950B2

(12) United States Patent
Wang et al.

(10) Patent No.: US 12,487,950 B2
(45) Date of Patent: Dec. 2, 2025

(54) SYSTEM POWER REDUCTION FOR DDR5 INFORMATION HANDLING SYSTEMS

(71) Applicant: DELL PRODUCTS L.P., Round Rock, TX (US)

(72) Inventors: Isaac Q. Wang, Austin, TX (US); Arnold Thomas Schnell, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/462,907

(22) Filed: Sep. 7, 2023

(65) Prior Publication Data

US 2025/0086126 A1 Mar. 13, 2025

(51) Int. Cl.
*G06F 13/16* (2006.01)

(52) U.S. Cl.
CPC ...... *G06F 13/1694* (2013.01); *G06F 13/1673* (2013.01); *G06F 13/1668* (2013.01)

(58) Field of Classification Search
CPC ............. G06F 13/1694; G06F 13/1673; G06F 13/1668
USPC ................................................. 711/170, 100
See application file for complete search history.

(56) References Cited

U.S. PATENT DOCUMENTS

| | | | | |
|---|---|---|---|---|
| 11,380,378 | B1 * | 7/2022 | Jiang | G11C 7/222 |
| 11,573,920 | B2 | 2/2023 | Das Sharma | |
| 2017/0351627 | A1 * | 12/2017 | Ware | G11C 7/1045 |
| 2021/0006330 | A1 | 1/2021 | McLoughlin | |
| 2022/0129201 | A1 * | 4/2022 | Bamdhamravuri | G06F 13/1673 |

* cited by examiner

*Primary Examiner* — Masud K Khan
*Assistant Examiner* — Zubair Ahmed
(74) *Attorney, Agent, or Firm* — Larson Newman, LLP

(57) ABSTRACT

An information handling system includes a memory module having clock inputs. Clock generation logic includes clock outputs, each clock output coupled to an associated one of the clock inputs. The information handling system determines whether the memory module is in a first configuration or a second configuration, enables a first number of the clock outputs when the memory module is in the first configuration, and enables a second number of the clock outputs when the memory module is in the second configuration, the first number being different from the second number.

16 Claims, 7 Drawing Sheets

100

SYSTEM POWER REDUCTION FOR DDR5 INFORMATION HANDLING SYSTEMS

FIELD OF THE DISCLOSURE

This disclosure generally relates to information handling systems, and more particularly relates to reducing system power in a DDR5 information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a memory module having clock inputs. Clock generation logic may include clock outputs, each clock output coupled to an associated one of the memory module's clock inputs. The information handling system may determine whether the memory module is in a first configuration or a second configuration, enable a first number of the clock outputs when the memory module is in the first configuration, and enable a second number of the clock outputs when the memory module is in the second configuration, the first number being different from the second number.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

It has been understood by the inventors of the current disclosure that, as memory data transfer rates in an information handling system increase up to 6000 mega-transfers per second (MT/s) and beyond, fifth generation double data rate (DDR5) memory modules incorporate an onboard clock buffer chip to address internal clock scaling on the memory module. However, the inclusion of the clock buffer chip results in additional power consumption by the memory module and adversely affects battery runtime, particularly in mobile systems. In an example, the use of the clock buffer chip at memory transfer rates at or above 6000 MT/s increases power consumption by the memory module of around 120 milliwatts (mW), which may translate to a 24 minute runtime reduction in mobile systems. It has been further understood that efforts at power reduction in memory subsystems such as illustrated by information handling system 100 have typically been limited to comparing which supplier has the lowest measured power consumption, and shipping information handling systems including the memory modules from the supplier with the lowest measured power consumption.

Figure 1:
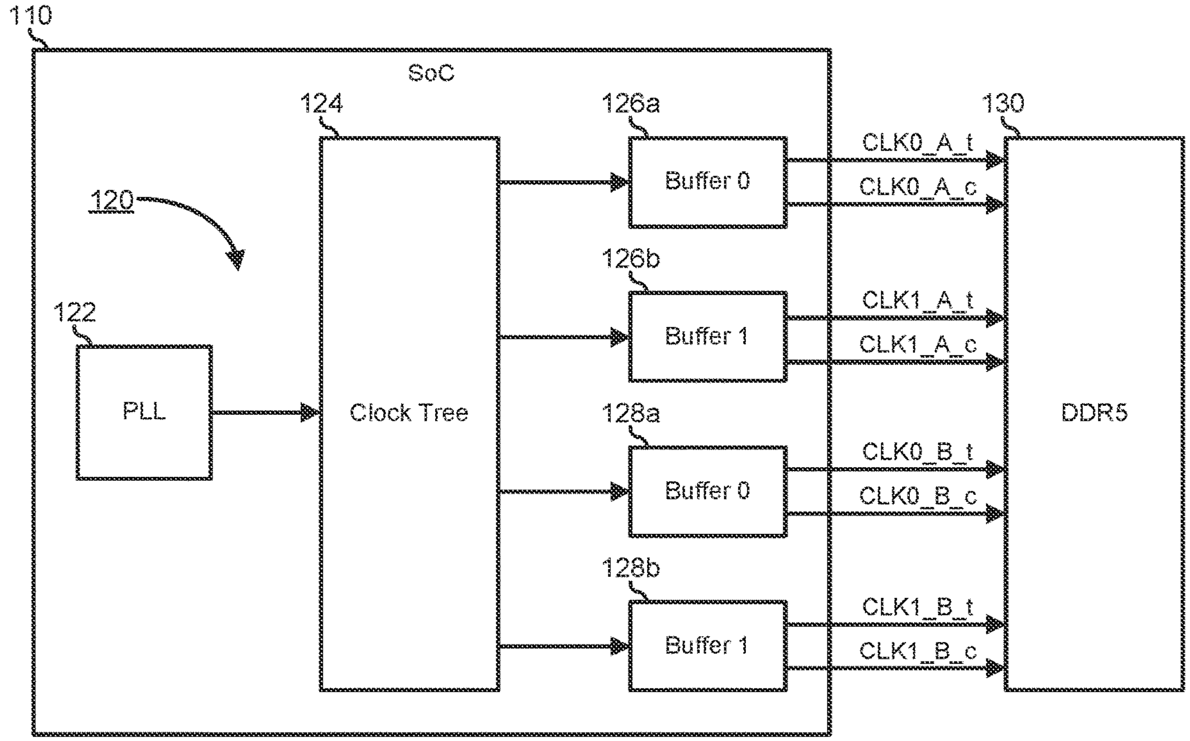
FIG. 1 is a block diagram of an information handling system according to an embodiment of the current disclosure.
Figure 2:
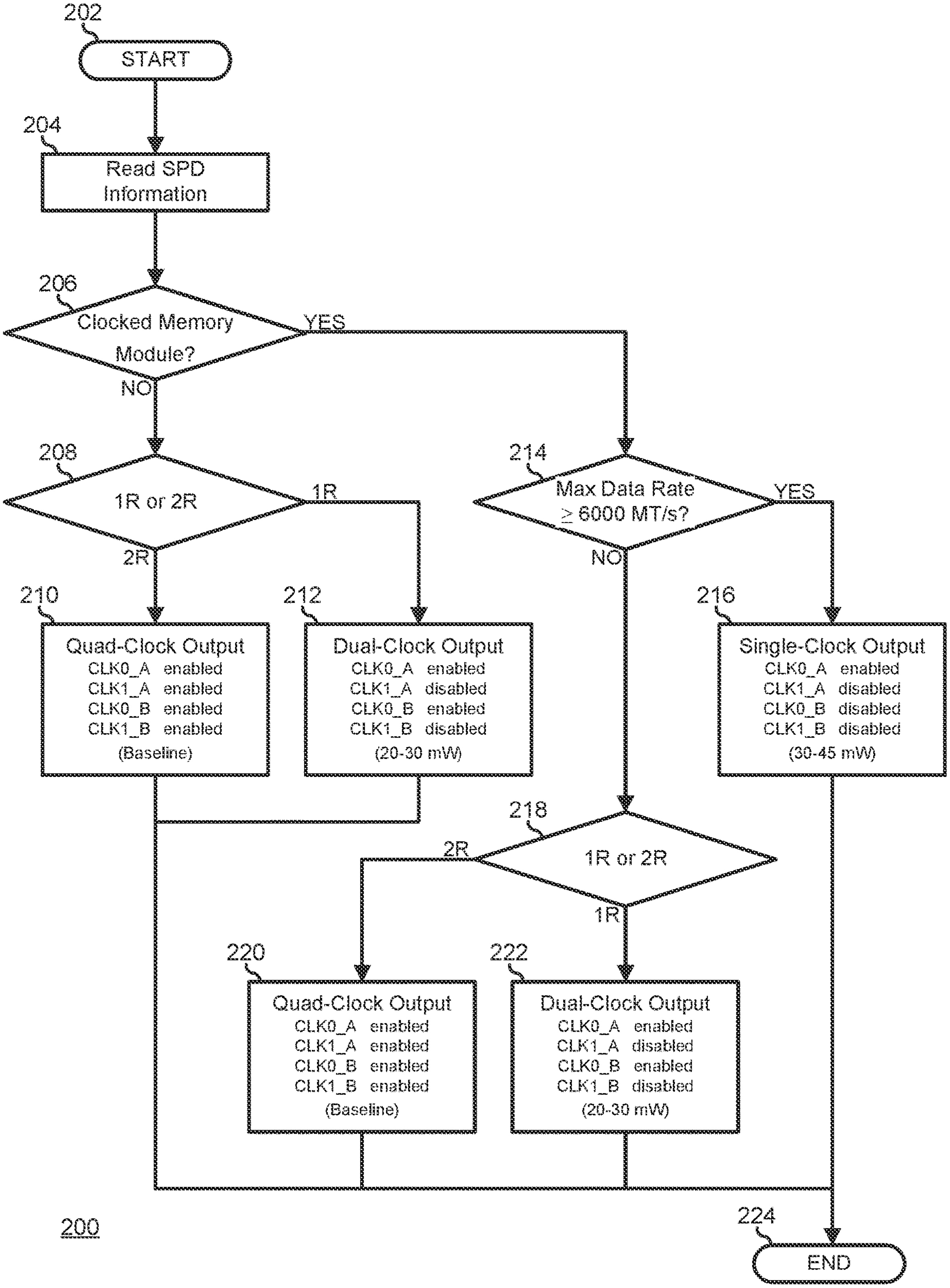
FIG. 2 is a flowchart illustrating a method of power reduction in the information handling system of FIG. 1.
Figure 3:
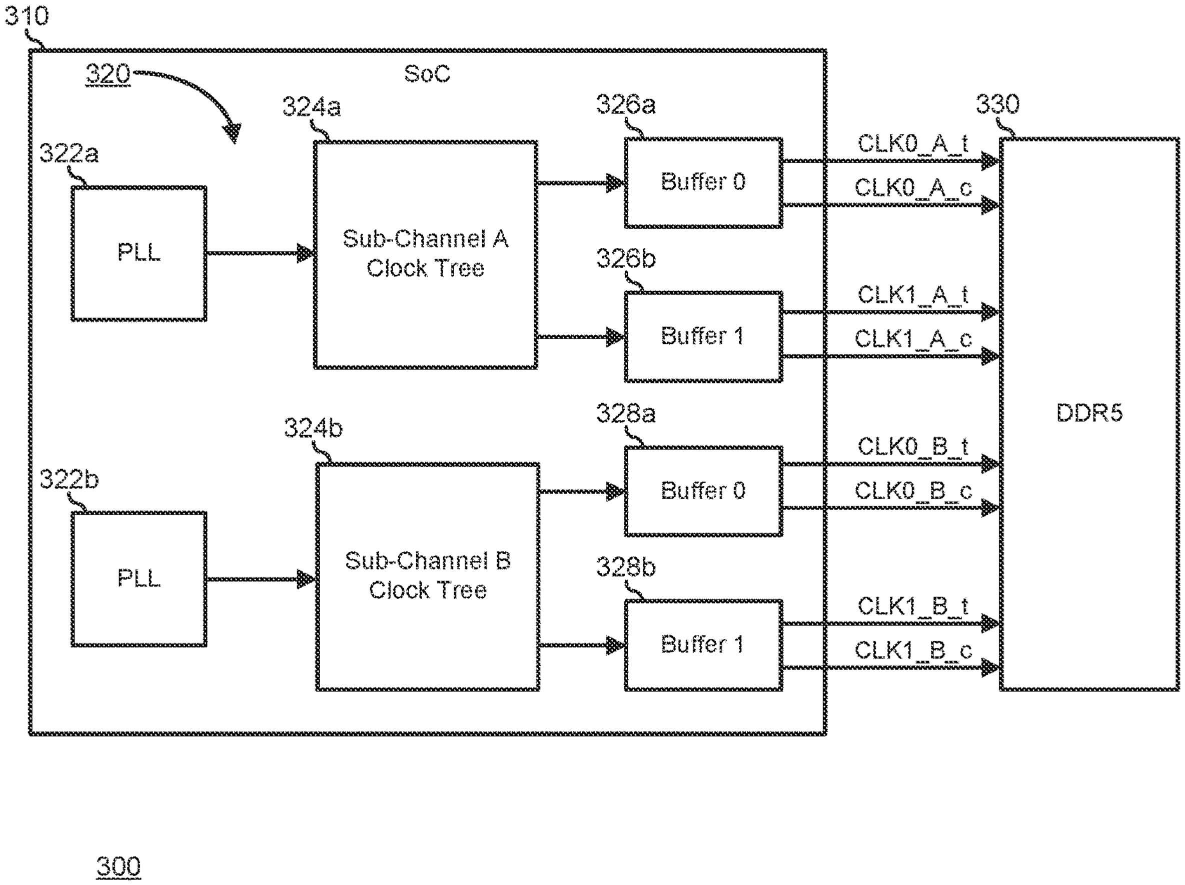
FIG. 3 is a block diagram of an information handling system according to another embodiment of the current disclosure.
Figure 4:
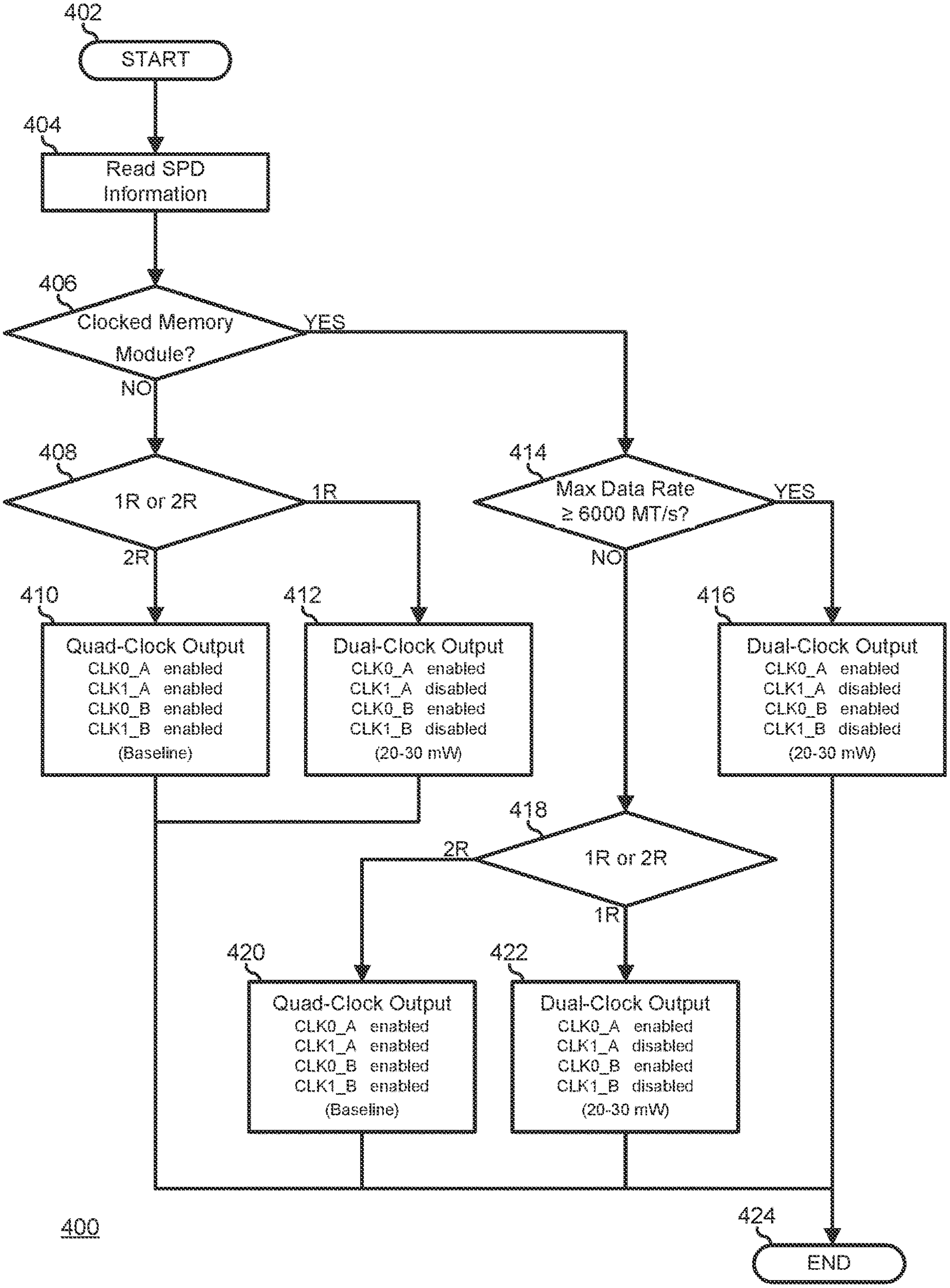
FIG. 4 is a flowchart illustrating a method of power reduction in the information handling system of FIG. 3.

In a particular embodiment, a method for system power reduction includes collecting memory topology information, making a projection of the power consumption of each operation scenario, and provisioning the clock tree scheme by selectively managing clock output buffers from a system-on-a-chip (SoC) and the clock buffer chips on the memory modules to realize an optimized power level based upon the projections. The projection of the power consumption is based on various inputs, including the SoC family and its associated clock topology, the number of memory ranks populated in the information handling system, the operating memory transfer rate, the memory supplier, the memory part number, and the like. FIG. 1 illustrates an information handling system 100 with a particular clock topology, and FIG. 2 illustrates a flowchart of a method 200 to realize system power reduction in such information handling systems, as described further below. FIG. 3 illustrates an information handling system 300 with another clock topology, and FIG. 4 illustrates a flowchart of a method 400 for system power reduction in such information handling system, as described further below.

Turning to FIG. 1, information handling system 100 includes a system-on-a-chip (SoC) 110 and a memory module 130. SoC 110 represents an integrated circuit device that includes all, or large portions, of the elements commonly associated with a computer system, and may include one or more processors, on-die memory, input/output (I/O) interfaces, interrupt controllers, and other functions such as may be typically found on one or more chipset device, graphics processing units (GPUs), or other elements of a computer system. Examples of SoC 110 may include highly integrated processor systems such as may be provided by processor manufacturers such as Intel, AMD, ARM, Broadcom, Qualcomm, or other manufacturers of processor SoCs.

Memory module 130 represents a fifth generation double data rate (DDR5) memory device, such as dual in-line memory modules (DIMMs), small outline DIMMs (SODIMMs), low power DIMMs (LPDIMMs), compression attached memory modules (CAMMs), or the like. Memory module 130 is characterized by its internal architecture as either a single-rank memory module (1R), or as a dual-rank memory module (2R). Memory module 130 is further characterized by the fact that the 64-bit data channel as may be found on past memory generations (that is DDR3, DDR4 etc.) is divided into two independent 32-bit data sub-channels and associated command/address (CA) busses. Further, each memory sub-channel (sub-channel A and sub-channel B) is provided with two (2) separate clock outputs (CLK0_A and CLK1_A for sub-channel A, and CLK0_B and CLK1_B for sub-channel B). When memory module 130 is a single-rank memory module, the first clock output (CLK0_A for sub-channel A, and CLK0_B for sub-channel B) may be provided for the memory devices in the single-rank. Similarly, when memory module 130 is a dual-rank memory module, the second clock output (CLK1_A for sub-channel A, and CLK1_B for sub-channel B) may be provided for the memory devices in the second rank.

However such a clock distribution scheme may be modified, as described further below, based upon whether or not memory module 130 includes a clock buffer chip that further distributes and conditions the clocking within the memory module. Each clock output is a differential-pair clock output consisting of a positive-edge clock signal (CLKX_Y_t) and a negative-edge clock signal (CLKX_Y_c). FIG. 1 omits the details of the data busses and associated CA busses for each sub-channel, and other details of power delivery, management interfaces, and the like, for simplicity of illustration of the current embodiments. The details on the provision of the clock outputs will be described further below. Other details of DDR5 memory modules are known in the art and will not be further described herein, except as may be needed to illustrate the current embodiments.

SoC 110 includes clock generation logic 120 that includes a phase-locked loop (PLL) 122, a clock tree 124, two (2) clock output buffers **126*a* and 126*b* for sub-channel A, and two (2) clock output buffers 128*a* and 128*b* for sub-channel B. PLL 122 operates to provide a clock output signal at a particular locked frequency. Clock tree 124 receives the clock output signal from PLL 122 and conditions the clock signal based upon the operating settings for information handling system 100. In particular, the clock output signal may be provided at a particular frequency that is lower than the desired operating frequency of memory module 130. Clock tree 124 may multiply the clock signal output by a particular ratio to derive the desired clock frequency for memory module 130. Clock tree 124 then distributes the clock signal at the desired clock frequency to clock output buffers 126*a*, 126*b*, 128*a*, and 128*b*. Clock output buffers 126*a*, 126*b*, 128*a*, and 128*b* convert the clock signal into the differential-pair clock outputs (CLKX_Y_t and CLKX_Y_c) to provide to memory module 130. As it relates to the illustrated clock generation topology of FIG. 1, SoC 110** may be understood to represent a SoC provided by Intel or other SoCs with a similar clock generation topology, as needed or desired. The details of clock generation in a SoC are known in the art and will not be further described herein, except as may be needed to illustrate the current embodiments.

In FIG. 2, method 200 starts at block 202. The serial presence detect (SPD) information is read from memory modules in an information handling system in block 204. The information handling system includes a SoC with a clock topology as shown and described above with reference to SoC 110. The SPD information and the clock topology information may be gathered by a system Basic Input/Output System/Universal Extensible Firmware Interface (BIOS/UEFI) during the execution of memory reference code (MRC) during a system boot phase of the information handling system, or at another time, as needed or desired. A decision is made, based upon the SPD information, as to whether or not the memory modules in the information handling system include clock buffer chips in decision block 206. If so, the "YES" branch of decision block 206 is taken and the method proceeds to decision block 214 as described below.

If the memory modules do not include clock buffer chips, the "NO" branch of decision block 206 is taken and a decision is made as to whether or not the memory modules are single-rank memory modules (1R) or dual-rank memory modules (2R) in decision block 208. If the memory modules are dual-rank memory modules (2R), the "2R" branch of decision block 208 is taken, the quad-state clock output mode of the SoC is selected in block 210, and the method ends in block 224. The quad-state clock output mode operates to enable all clock output buffers on the SoC such that the SoC provides signals on the CLK0_A, CLK1_A, CLK0_B, and CLK1_B outputs. This may represent the baseline configuration against which additional power consumption savings, as described below, are measured. If the memory modules are single-rank memory modules (1R), the "IR" branch of decision block 208 is taken, the dual-state clock output mode of the SoC is selected in block 212, and the method ends in block 224. The dual-state clock output mode operates to enable two (2) clock output buffers (one (1) per memory sub-channel) on the SoC such that the SoC provides signals on the CLK0_A and CLK0_B outputs, and disables the CLK1_A and CLK1_B outputs. In a particular case, the dual-state clock output mode has been found to provide a 20-30 mW reduction in the system power consumption over the quad-state clock output mode.

Returning to decision block 206, when the memory modules in the information handling system include clock buffer chips and the "YES" branch of decision block 206 is taken, a decision is made as to whether or not the maximum data transfer rate is greater than or equal to 6000 MT/s in decision block 214. If so, the "YES" branch of decision block 214 is taken, the single-state clock output mode of the SoC is selected in block 216, and the method ends in block 224. The single-state clock output mode operates to enable only one (1) clock output buffer on the SoC such that the SoC provides a clock signal on only, for example, the CLK0_A output, and CLK1_A, CLK0_B, and CLK1_B outputs are disabled. In a particular case, the single-state clock output mode has been found to provide a 30-45 mW reduction in the system power consumption over the quad-state clock output mode.

If the maximum data transfer rate is not greater than or equal to 6000 MT/s, the "NO" branch of decision block 214 is taken and a decision is made as to whether or not the memory modules are single-rank memory modules (1R) or dual-rank memory modules (2R) in decision block 218. If the memory modules are dual-rank memory modules (2R), the "2R" branch of decision block 218 is taken, the quad-state clock output mode of the SoC is selected in block 220, and the method ends in block 224. If the memory modules are single-rank memory modules (1R), the "IR" branch of decision block 218 is taken, the dual-state clock output mode of the SoC is selected in block 222, and the method ends in block 224. The indicated power reductions provided in the dual-state clock output mode and the single-state clock output mode are system level power reductions, and such power reductions may be augmented by also configuring the memory modules to operate their clock buffer chips, as applicable, in similar operating modes, as needed or desired. In a particular case, module-level power reductions of up to an additional 53 mW may be seen.

Turning to FIG. 3, information handling system 300 includes a system-on-a-chip (SoC) 310 similar to SoC 110 and a memory module 330 similar to memory module 130. Memory module 330 is characterized by its internal architecture as either a single-rank memory module (1R), or as a dual-rank memory module (2R). Each memory sub-channel (sub-channel A and sub-channel B) is provided with two (2) separate clock outputs (CLK0_A and CLK1_A for sub-channel A, and CLK0_B and CLK1_B for sub-channel B). When memory module 330 is a single-rank memory module, the first clock output (CLK0_A for sub-channel A, and CLK0_B for sub-channel B) may be provided for the memory devices in the single-rank. Similarly when memory module 330 is a dual-rank memory module, the second clock output (CLK1_A for sub-channel A, and CLK1_B for sub-channel B) may be provided for the memory devices in the second rank. However, such a clock distribution scheme may be modified, as described further below, based upon whether or not memory module 330 includes a clock buffer chip that further distributes and conditions the clocking within the memory module. Each clock output is a differential-pair clock output consisting of a positive-edge clock signal (CLKX_Y_t) and a negative-edge clock signal (CLKX_Y_c). FIG. 3 omits the details of the data busses and associated CA busses, and other details of power delivery, management interfaces, and the like for simplicity of illustration of the current embodiments. The details on the provision of the clock outputs will be described further below.

SoC 310 includes clock generation logic 320 that includes PLLs 322*a* and 322*b*, clock trees 324*a* and 324*b*, two (2) clock output buffers 326*a* and 326*b* for sub-channel A, and two (2) clock output buffers 328*a* and 328*b* for sub-channel B. PLLs 322*a* and 322*b* are similar to PLL 122, and operate to provide clock output signals at a particular locked frequency. Clock trees 324*a* and 324*b* receive the clock output signals from respective PLLs 322*a* and 322*b* and condition the clock signals based upon the operating settings for information handling system 300. In particular, the clock output signals may be provided at a particular frequency that is lower than the desired operating frequency of memory module 330. Clock trees 324*a* and 324*b* may operate to multiply the clock signal outputs by a particular ratio to derive the desired clock frequency for memory module 330. Clock tree 324*a* then distributes the clock signals at the desired clock frequency to clock output buffers 326*a* and 326*b*, and clock tree 324*b* then distributes the clock signals at the desired clock frequency to clock output buffers 328*a* and, 328*b*. Clock output buffers 326*a*, 326*b*, 328*a*, and 328*b* convert the clock signal into the differential-pair clock outputs (CLKX_Y_t and CLKX_Y_c) to provide to memory module 330. As it relates to the illustrated clock generation topology of FIG. 3, SoC 310 may be understood to represent a SoC provided by AMD, or other SoCs with a similar clock generation topology, as needed or desired.

In FIG. 4, method 400 starts at block 402. The serial presence detect (SPD) information is read from memory modules in an information handling system in block 404. The information handling system includes a SoC with a clock topology as shown and described above with reference to SoC 310. The SPD information and the clock topology information may be gathered by a system Basic Input/Output System/Universal Extensible Firmware Interface (BIOS/UEFI) during the execution of memory reference code (MRC) during a system boot phase of the information handling system, or at another time, as needed or desired. A decision is made, based upon the SPD information, as to whether or not the memory modules in the information handling system include clock buffer chips in decision block 406. If so, the "YES" branch of decision block 406 is taken and the method proceeds to decision block 414 as described below.

If the memory modules do not include clock buffer chips, the "NO" branch of decision block 406 is taken and a decision is made as to whether or not the memory modules are single-rank memory modules (1R) or dual-rank memory modules (2R) in decision block 408. If the memory modules are dual-rank memory modules (2R), the "2R" branch of decision block 408 is taken, the quad-state clock output mode of the SoC is selected in block 410, and the method ends in block 424. The quad-state clock output mode operates to enable all clock output buffers on the SoC such that the SoC provides signals on the CLK0_A, CLK1_A, CLK0_B, and CLK1_B outputs. Again, this may be understood to represent the baseline configuration against which additional power consumption savings, as described below, are measured. If the memory modules are single-rank memory modules (1R), the "IR" branch of decision block 408 is taken, the dual-state clock output mode of the SoC is selected in block 412, and the method ends in block 424. The dual-state clock output mode operates to enable two (2) clock output buffers (one (1) per memory sub-channel) on the SoC such that the SoC provides signals on the CLK0_A and CLK0_B outputs, and disables the CLK1_A and CLK1_B outputs. In a particular case, the dual-state clock output mode has been found to provide a 20-30 mW reduction in the system power consumption over the quad-state clock output mode.

Returning to decision block 406, when the memory modules in the information handling system include clock buffer chips and the "YES" branch of decision block 406 is taken, a decision is made as to whether or not the maximum data transfer rate is greater than or equal to 6000 MT/s in decision block 414. If so, the "YES" branch of decision block 414 is taken, the dual-state clock output mode of the SoC is selected in block 416, and the method ends in block 424. If the maximum data transfer rate is not greater than or equal to 6000 MT/s, the "NO" branch of decision block 414 is taken and a decision is made as to whether or not the memory modules are single-rank memory modules (1R) or dual-rank memory modules (2R) in decision block 418. If the memory modules are dual-rank memory modules (2R), the "2R" branch of decision block 418 is taken, the quad-state clock output mode of the SoC is selected in block 420, and the method ends in block 424. If the memory modules are single-rank memory modules (1R), the "IR" branch of decision block 418 is taken, the dual-state clock output mode of the SoC is selected in block 422, and the method ends in block 424. The indicated power reductions provided in the dual-state clock output mode and the single-state clock output mode. are system level power reductions, and such power reductions may be augmented by also configuring the memory modules to operate their clock buffer chips, as applicable, in similar operating modes, as needed or desired.

Figure 5:
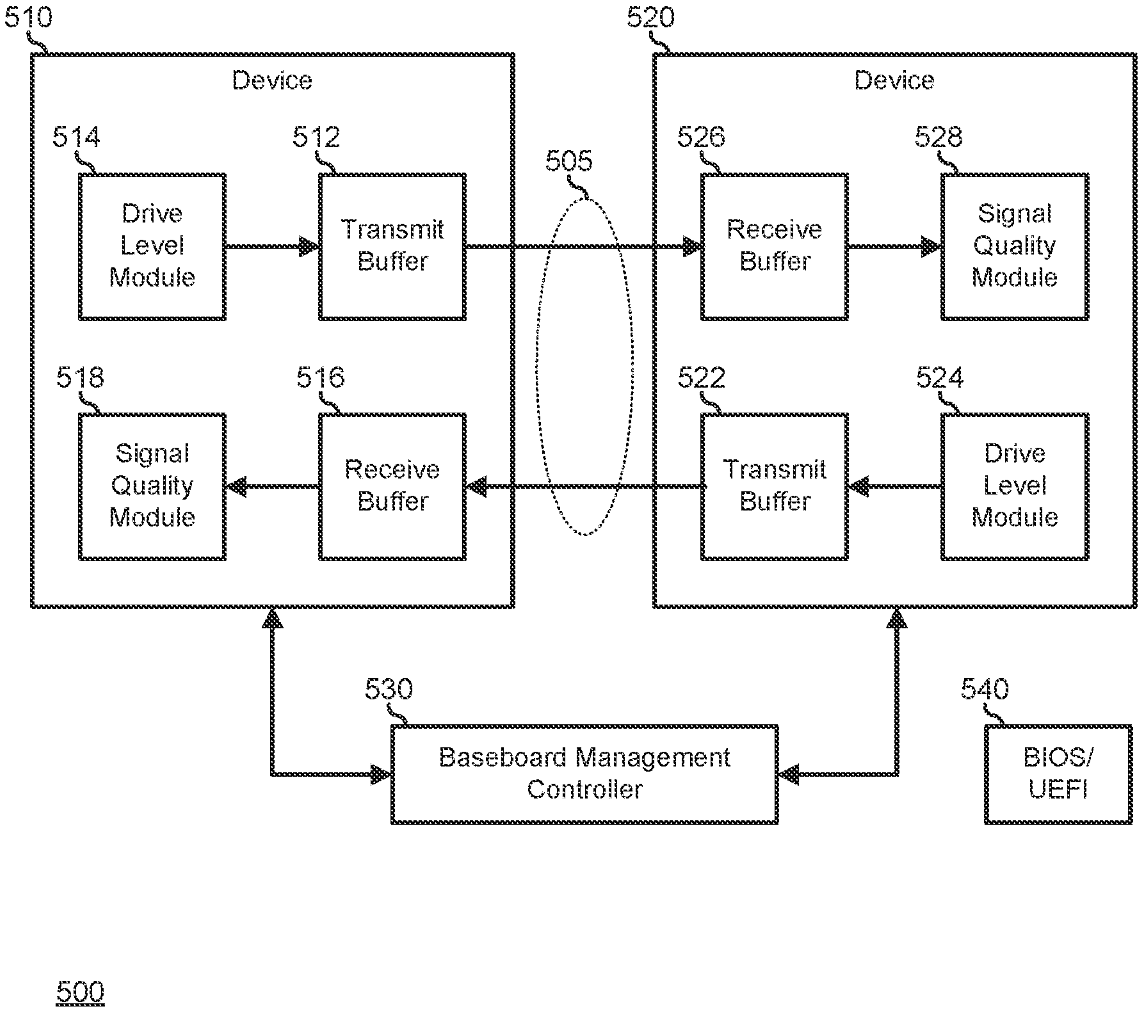
FIG. 5 is a block diagram of an information handling system according to an embodiment of the current disclosure.

FIG. 5 illustrates an information handling system 500 including devices 510 and 520 connected together by a high-speed data communication interface lane 505 (hereinafter "data lane 505"), a baseboard management controller (BMC) 530, and a BIOS/UEFI 540. Devices 510 and 520 represent integrated circuit devices that have need to communicate data with each other, such as a SoC and a memory module as depicted in information handling systems 100 and 300 described above, between a processor and a chipset device, between a storage controller and a storage device, or any other type of devices that may be understood to be connected together by a high-speed data communication interface. Device 510 includes a transmit buffer 512 for data lane 505, a drive level module 514, a receive buffer 516 for the data lane, and a signal quality module 518. Similarly, device 520 includes a transmit buffer 522 for data lane 505, a drive level module 524, a receive buffer 526 for the data lane, and a signal quality module 528. Data lane 505 provides unidirectional communication between transmit buffer 512 and receive buffer 526, and between transmit buffer 522 and receive buffer 516.

However the particular topology illustrated herein is not necessary to the understanding of the teachings of the current disclosure, but is provided for the simplicity of illustration of the current embodiments. In particular, data lane 505 may be representative of various different data signaling topologies. Thus in the illustrated example, data lane 505 may be representative of a serial data interface, such as a single lane of a multi-lane PCIe link, or another serial data interface, and that utilizes differential signaling, as needed or desired. In this case, data lane 505 would be understood to include a differential pair from transmit buffer 512 to receive buffer 526, and a second differential pair from transmit buffer 522 to receive buffer 516. In another example, data lane 505 may be a part of a high-speed data communication bus that utilizes single-ended bidirectional signaling, such as may be found on various DDR memory standards for data busses, CA busses, and the like, or other single-ended bus-based topologies, as needed or desired. In this case, a data lane would be understood to include transceivers in the connected devices that both send and receive duplexed data. Further, high-speed data communication link 505 may be representative of a serial data interface that utilizes differential signaling. More broadly, the current embodiment is directed to providing power consumption savings in an information handling system by managing the signal drive levels of transmit elements of a high-speed data communication lane, and such teachings may be understood to be applicable to high-speed data communication interfaces generally, without distinguishment based upon a particular topology.

The drive strength of transmit buffers 512 and 522 are controlled respectively by drive level modules 514 and 524. It will be understood that the amount of power consumed by data lane 505 can be increased by driving transmit buffers 512 and 522 at a higher drive strength, and can be decreased by driving the transmit buffers at a lower drive strength. Thus it may seem desirable to decrease the drive strength of transmit buffers 512 and 522 to ever lower levels in order to reduce the power consumed by data lane 505. However driving transmit buffers 512 and 522 at an ever lower drive strength may result in data transmission failures on data lane 505 because the drive strength of the transmit buffers affects the signal strength received by respective receive buffers 526 and 516, and too low a received signal strength leaves the receive buffers susceptible to data errors.

Receive buffers 516 and 526 provide the received signals to respective signal quality modules 518 and 528, and derive information related to the quality of the received signals. The signal quality information may depend upon the type of high-speed data communication interface that is instantiated on devices 510 and 520, on the training and initialization processes associated with the type of high-speed data communication interface, the particular functionality of the devices in implementing the type of high-speed data communication interface, or other factors as needed or desired. For example, the signal quality information may include measurements of the physical characteristics of the signals received by receive buffers 516 and 526, such as the characteristics of a data eye obtained by the receivers, including data eye voltage margins, data timing margins, or the like, slew rate information for the received signals, or other physical characteristics of the received signals, as needed or desired.

In another example, the signal quality information may include measurements that are derived from the received signals, such as correctable error rates, bit error rates, data retry rates, or other derived measurements of the quality of the received signals, as needed or desired. In either case, signal quality modules 518 and 528 may be configured to provide the signal quality information for processing by other agents of information handling system 500, as described further below, or may operate to implement various signal quality thresholds to ensure that the quality of the received signals is sufficient to provide reliable operation of data link 505. For example, signal quality modules 518 and 528 may operate to perform various signal quality compensation actions on the received signals to recover a usable data signal, enhance or amplify the received signal, provide various compensations to the received signal to account for inter-symbol interference (ISI), or the like.

BMC 530 represents an out-of-band processing system of information handling system 500 that operates separately from a host processing system of the information handling system, and that operates to monitor, manage, and maintain the operation of the information handling system. BMC 530 may be connected to devices 510 and 520 through a physical management interface, such as a two-wire low-speed data communication interface, like a system management bus (SMB) interface, an Inter-Integrated Circuit (12) interface, an Improved I2C (I2C) interface, or the like, or may be connected by a virtual interface whereby the host processing system provides communication with the device, and in turn communicates with the BMC by a host-to-BMC interface, as needed or desired.

In a particular embodiment, during an initialization phase of operation of information handling system 500, data lane 505 is trained, and signal quality modules 518 and 528 provide the signal quality information to BMC 530, and the BMC operates to provide the signal quality information to an initialization agent, such as BIOS/UEFI 540. BIOS/UEFI 540 operates to compare the signal quality information with various signal quality thresholds to determine if there is any excess margin in the trained data lane 505. If so, then BIOS/UEFI 540 determines that a power savings may be had on data lane 505 by reducing the drive level of the associated transmit buffer 512 or 522, as indicated by the signal quality information. Then BIOS/UEFI 540 directs BMC 530 to communication a new, reduced drive level for the affected transmit buffer 512 or 522 to reduce the power consumed on data link 505. In another embodiment, BMC 530 may be unused in the power reduction of information handling system 500. BIOS/UEFI 540 may communicate directly with devices 510 and 520 utilizing in-band communications over data link 505. However such in-band communications for training may increase the data bandwidth utilization of data lane 505, or may increase the time needed to train the data lane. Where a single drive level setting is utilized for multiple data lanes, the process as described will implement the power consumption savings across the multiple data lanes.

In another embodiment, the appropriate drive strength is characterized for the devices during product validation, and the characterization information may be utilized to provide a starting drive strength for the system for training purposes. In this embodiment, various considerations surrounding the particulars of the design of the information handling system may be accounted for, such as proximity of the devices to each other (that is, closer devices mounted on PCBs with lower loss laminates can have lower drive strength values for initiating the training). In another embodiment the signal quality information is retrieved during a run time operation phase of information handling system 500, and the drive strength is adjusted on the fly. In this way, changes to information handling system 500, due, for example to timing changes, voltage margin changes, temperature changes, or other changes, may be taken into account when setting the driver strength.

Figure 6:
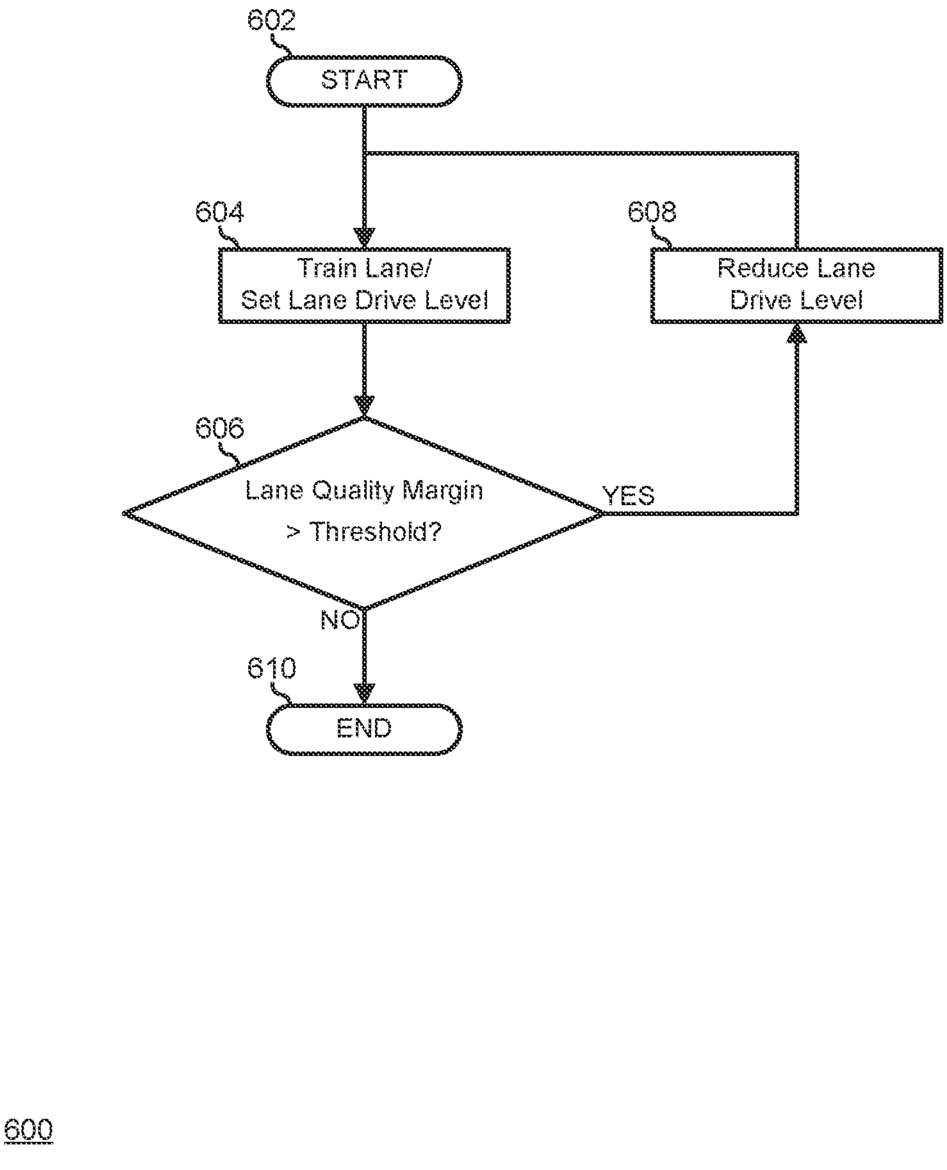
FIG. 6 is a flowchart illustrating a method of power reduction in the information handling system of FIG. 5.

FIG. 6 illustrates a flowchart of a method 600 for system power reduction in an information handling system such as information handling system 500, starting at block 502. An information handling system initiates training of a data communication lane and sets a lane drive strength level in block 604. The data communication lane may represent a bidirectional data lane of a bus of lanes, or may represent a unidirectional lane of a link, as needed or desired. A decision is made as to whether or not quality information for the lane indicates that the lane quality is above a threshold margin in decision block 606. If not, the "NO" branch of decision block 606 is taken and the method ends in block 610. If the quality information for the lane indicates that the lane quality is above a threshold margin, the "YES" branch of decision block 606 is taken, the drive strength level for the lane is reduced in block 608, and the method returns to block 604 where the data communication lane is retrained with the new lane drive strength level.

Figure 7:
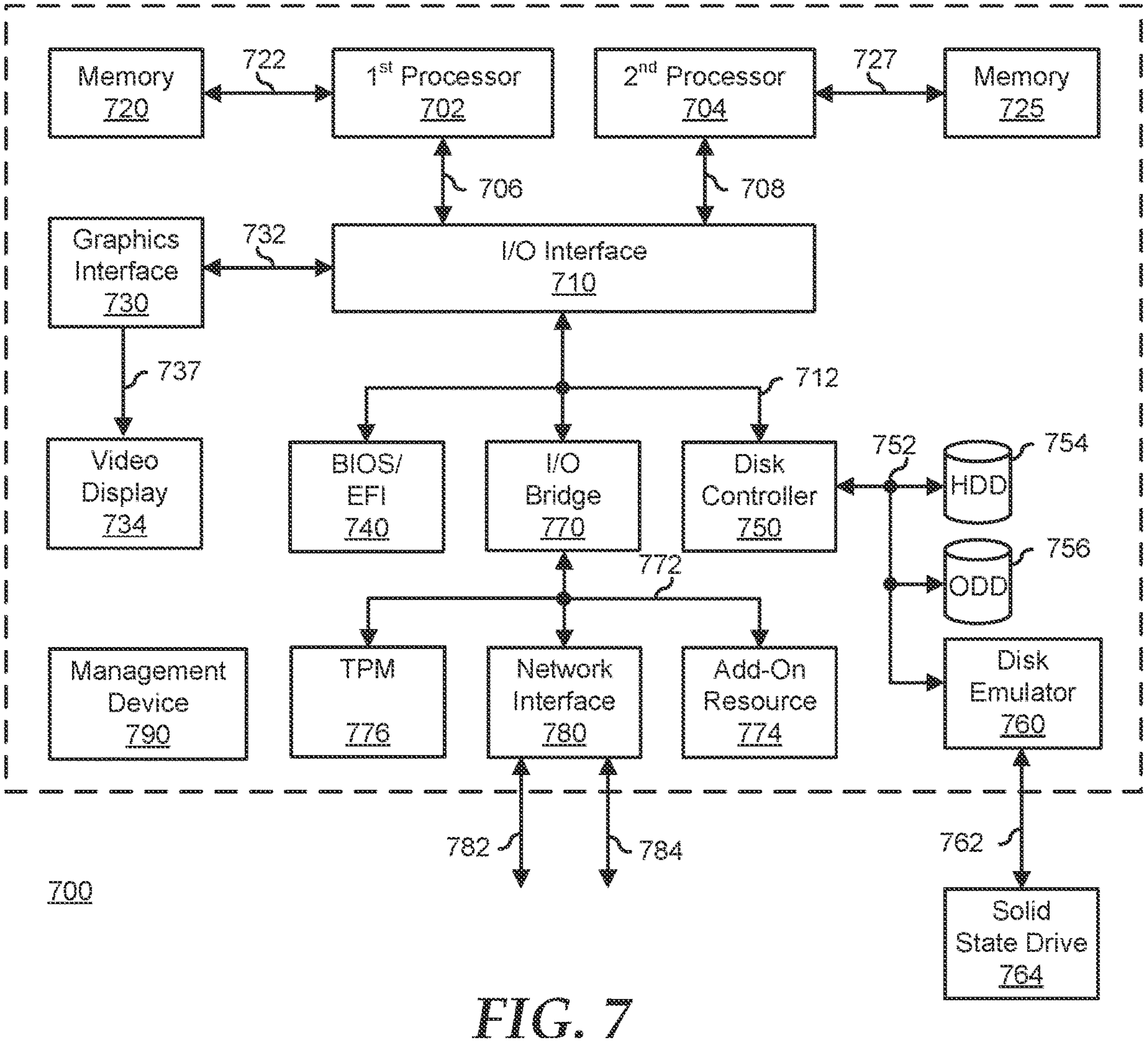
FIG. 7 is a block diagram illustrating a generalized information handling system according to another embodiment of the present disclosure.

FIG. 7 illustrates a generalized embodiment of an information handling system 700. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 700 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described below, and operates to perform one or more of the methods described below. Information handling system 700 includes a processors 702 and 704, an input/output (I/O) interface 710, memories 720 and 725, a graphics interface 730, a basic input and output system/universal extensible firmware interface (BIOS/UEFI) module 740, a disk controller 750, a hard disk drive (HDD) 754, an optical disk drive (ODD) 756, a disk emulator 760 connected to an external solid state drive (SSD) 764, an I/O bridge 770, one or more add-on resources 774, a trusted platform module (TPM) 776, a network interface 780, a management device 790, and a power supply 795. Processors 702 and 704, I/O interface 710, memory 720, graphics interface 730, BIOS/UEFI module 740, disk controller 750, HDD 754, ODD 756, disk emulator 760, SSD 764, I/O bridge 770, add-on resources 774, TPM 776, and network interface 780 operate together to provide a host environment of information handling system 700 that operates to provide the data processing functionality of the information handling system. The host environment operates to execute machine-executable code, including platform BIOS/UEFI code, device firmware, operating system code, applications, programs, and the like, to perform the data processing tasks associated with information handling system 700.

In the host environment, processor 702 is connected to I/O interface 710 via processor interface 706, and processor 704 is connected to the I/O interface via processor interface 708. Memory 720 is connected to processor 702 via a memory interface 722. Memory 725 is connected to processor 704 via a memory interface 727. Graphics interface 730 is connected to I/O interface 710 via a graphics interface 732, and provides a video display output 736 to a video display 734. In a particular embodiment, information handling system 700 includes separate memories that are dedicated to each of processors 702 and 704 via separate memory interfaces. An example of memories 720 and 725 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 740, disk controller 750, and I/O bridge 770 are connected to I/O interface 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 710 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 740 includes BIOS/UEFI code operable to detect resources within information handling system 700, to provide drivers for the resources, initialize the resources, and access the resources. BIOS/UEFI module 740 includes code that operates to detect resources within information handling system 700, to provide drivers for the resources, to initialize the resources, and to access the resources.

Disk controller 750 includes a disk interface 752 that connects the disk controller to HDD 754, to ODD 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits SSD 764 to be connected to information handling system 700 via an external interface 762. An example of external interface 762 includes a USB interface, an IEEE 2394 (Firewire) interface, a proprietary interface, or a combination thereof. Alternatively, solid-state drive 764 can be disposed within information handling system 700.

I/O bridge 770 includes a peripheral interface 772 that connects the I/O bridge to add-on resource 774, to TPM 776, and to network interface 780. Peripheral interface 772 can be the same type of interface as I/O channel 712, or can be a different type of interface. As such, I/O bridge 770 extends the capacity of I/O channel 712 when peripheral interface 772 and the I/O channel are of the same type, and the I/O bridge translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as I/O interface 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Management device 790 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 700. In particular, management device 790 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 700, such as system cooling fans and power supplies. Management device 790 can include a network connection to an external management system, and the management device can communicate with the management system to report status information for information handling system 700, to receive BIOS/UEFI or system firmware updates, or to perform other task for managing and controlling the operation of information handling system 700. Management device 790 can operate off of a separate power plane from the components of the host environment so that the management device receives power to manage information handling system 700 when the information handling system is otherwise shut down. An example of management device 790 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 790 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:

a memory module including a plurality of clock inputs; and a system-on-a-chip (SoC) having clock generation logic including a plurality of clock outputs, each clock output coupled to provide a clock signal to an associated one of the clock inputs;

wherein the clock generation logic is configured to determine whether the memory module is a dual-rank memory module or a single-rank memory module, enable a first number of the clock outputs when the memory module is the dual-rank memory module, and enable a second number of the clock outputs when the memory module is the single-rank memory module, the first number being different from the second number.

2. The information handling system of claim 1, wherein the first number of clock outputs is equal to four (4) clock outputs, and the second number of clock outputs is equal to two (2) clock outputs.

3. The information handling system of claim 1, wherein the clock generation logic is further configured to determine whether the memory module includes a clock buffer chip.

4. The information handling system of claim 3, wherein, when the memory module includes the clock buffer chip, the clock generation logic is further configured to determine whether the memory module operates at greater than or equal to 6000 mega-transfers per second.

5. The information handling system of claim 4, wherein, when the memory module operates at greater than or equal to 6000 mega-transfers per second, the clock generation logic is further configured to enable only one (1) clock output.

6. The information handling system of claim 4, wherein, when the memory module operates at less than 6000 mega-transfers per second, the clock generation logic is further configured to enable the first number of the clock outputs when the memory module is the dual-rank memory module, and to enable the second number of the clock outputs when the memory module is the single-rank memory module.

7. The information handling system of claim 1, wherein the clock generation logic includes a single clock tree.

8. The information handling system of claim 1, wherein the clock generation logic includes two (2) clock trees.

9. A method, comprising:

providing, on an information handing system, a memory module including a plurality of clock inputs;

providing, on the information handling system, a system-on-a-chip having clock generation logic including a plurality of clock outputs, each clock output coupled to provide a clock signal to an associated one of the clock inputs;

determining whether the memory module is in dual-rank memory module or a single-rank memory module;

enabling, by the clock generation logic, a first number of the clock outputs when the memory module is the dual-rank memory module; and enabling, by the clock generation logic, a second number of the clock outputs when the memory module is the single-rank memory module, the first number being different from the second number.

10. The method of claim 9, wherein the first number of clock outputs is equal to four (4) clock outputs, and the second number of clock outputs is equal to two (2) clock outputs.

11. The method of claim 9, further comprising:

determining whether the memory module includes a clock buffer chip.

12. The method of claim 11, wherein, when the memory module includes the clock buffer chip, the clock generation logic is further configured to determine whether the memory module operates at greater than or equal to 6000 mega-transfers per second.

13. The method of claim 12, wherein, when the memory module operates at greater than or equal to 6000 mega-transfers per second, the clock generation logic is further configured to enable only one (1) clock output.

14. The information handling system of claim 12, wherein, when the memory module operates at less than 6000 mega-transfers per second, method further comprises:

enabling, by the clock generation logic, the first number of the clock outputs when the memory module is the dual-rank memory module; and enabling, by the clock generation logic, the second number of the clock outputs when the memory module is the single-rank memory module.

15. The method of claim 9, wherein the memory module is a fifth generation double data rate (DDR5) memory module.

16. An information handling system, comprising:

a fifth generation double data rate memory module including four (4) clock inputs; and a system-on-a-chip having clock generation logic including four (4) clock outputs, each clock output coupled to provide a clock signal to an associated one of the clock inputs;

wherein the Clock generation logic is configured to determine whether the memory module is a dual-rank memory module or a single-rank memory module, enable four (4) clock outputs when the memory module is the dual-rank memory module and operates at less than 6000 mega-transfers per second, enable two (2) clock outputs when the memory module is the single-rank memory module and operates at less than 6000 mega-transfers per second, and enable only one (1) clock output when the memory module operates at greater than or equal to 6000 mega-transfers per second.

* * * * *